W. W. DEAN.
MOTOR GOVERNING DEVICE.
APPLICATION FILED MAY 16, 1919.
1,393,433.
Patented Oct. 11, 1921.
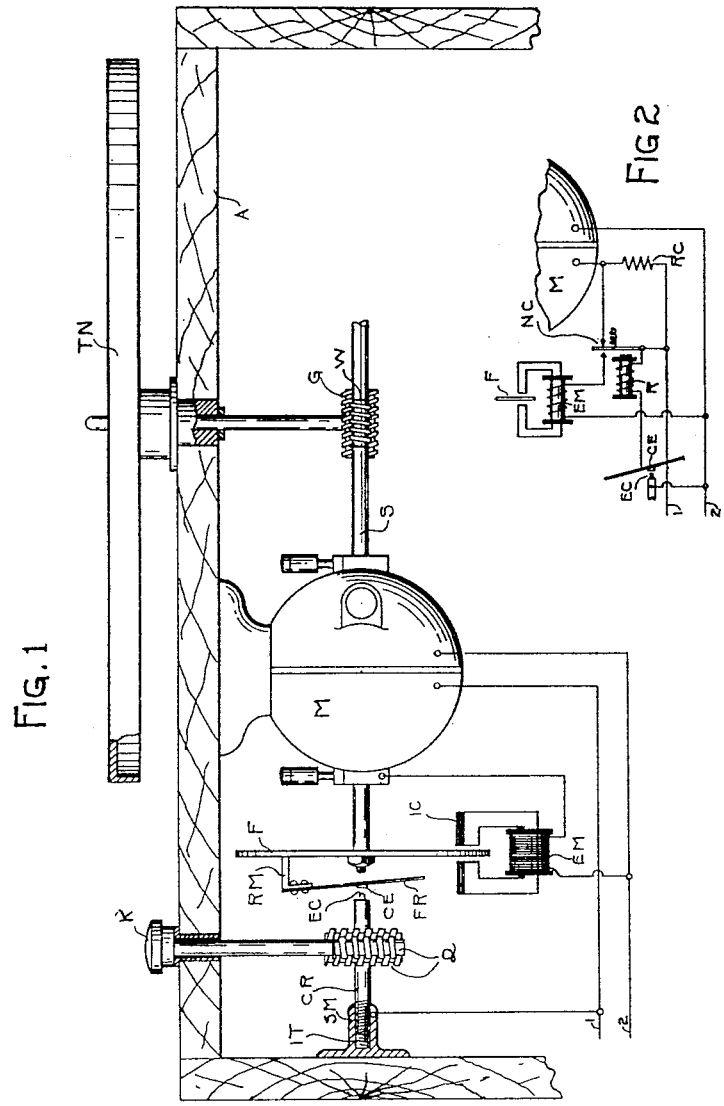
INVENTOR
W. W. DEAN
BY Frank M. Dough
ATTORNEY

UNITED STATES PATENT OFFICE.

WILLIAM W. DEAN, OF WILMETTE, ILLINOIS, ASSIGNOR TO EFFICIENCY ELECTRIC CORPORATION, OF NEW YORK, N. Y., A CORPORATION OF NEW YORK.

MOTOR-GOVERNING DEVICE.

1,393,433. Specification of Letters Patent. Patented Oct. 11, 1921.

Application filed May 16, 1919. Serial No. 297,623.

*To all whom it may concern:*

Be it known that I, WILLIAM W. DEAN, a citizen of the United States, residing at Wilmette, in the county of Cook and State of Illinois, have invented certain new and useful Improvements in Motor-Governing Devices; and I do hereby declare the following to be a full, clear, concise, and exact description of the invention, such as will enable those skilled in the art to which it appertains to make and use the same.

My invention relates to motor governing devices, and more particularly to devices which are responsive to the speed of an electric motor to control such speed.

More particularly my invention is especially adapted for use in connection with electric phonograph motors, and is adaptable to operate in connection with so called "universal" motors which are capable of operating interchangeably on alternating and direct current sources of current supply.

In the present invention I disclose a motor speed controlling system involving the very minimum of the very simplest kind of positively operating elements which is inexpensive to manufacture, easy to assemble, and when operated is capable of being easily adjusted and adapted to maintain such adjustment for long periods of time.

Other objects of my invention and the invention itself will be made clear by reference to the drawings accompanying this specification in which at:—

Figure 1, I show an embodiment of my invention used to control the speed of a phonograph electric motor.

In Fig. 2, I show a modification of the system of Fig. 1, involving the use of a relay and by virtue of this relay the energization of the motor is made variable, according to the degree of speed corrections required; this control of the motor energization being in addition to the effect produced by the electrical brake effect which is produced in the structure illustrated in Fig. 1.

Referring to Fig. 1, at A, I show a section of a phonograph cabinet in which is mounted a phonograph electric motor M, which may be of the series or shunt wound type, and may in order to meet the various cinditions of practice, be preferably constructed of the so called "universal" type which are capable of operating with alternating or direct currents.

A motor shaft S, for the motor, carries a worm member W, which engages a coöperating gear member G, in order to drive the phonograph turn-table TN.

At F, I show a flywheel member preferably constructed of copper or an equivalent metal which may be a good conductor of electricity, there being an extension of the member F, shown at RM, to which extension is secured a flexible reed member FR.

Secured to a mid point of this member FR, is an electrical contact CE, disposed in alinement with the axis of rotation of the shaft S, and adapted to coöperate when the motor is operated with an opposing electrical contact EC. The opposing contact EC is stationary, and its position may be adjusted by means of an adjusting knob K, operating through a worm and gear mechanism Q; the arrangement being such that upon turning the knob K, the contact carrying rod R is rotated, and by virtue of an external thread T on the rod and a coöperating internal thread IT in the supporting mount SM, the contact EC upon such rotation of the rod is advanced, being withdrawn toward or from the reed contact CE. The disposition of the reed spring FR, is such that it normally extends in a plane at an angle to the plane of rotation of the shaft and the carried flywheel member F, and by centrifugal force its outer extermity is caused to be thrown outwardly, and the effective result is that the end of the reed member is deflected in a direction tending to bring the reed spring into alinement with the aforesaid plane of rotation, and thus the contact CE upon increasing motor speeds is advanced outwardly on a direction away from the motor until when a predetermined speed is reached, the reed carried contact CE engages the stationary contact EC. When this occurs, a circuit is completed extending in a bridge of the power circuit conductors 1 and 2, this circuit containing the serially connected governing contacts EC—CE, and an electromagnet winding EM.

The electromagnet winding is carried on a laminated iron or steel core, which preferably I construct of silicon steel stampings as these are found to introduce very little eddy current and hysteresis losses with a maximum of magnetic permeability at low magnetic densities.

I preferably make the electromagnet winding EM, of a large number of turns of wire, so as to secure a sufficient magnetic effect; and the wire being of small diameter a relatively high resistance is interposed in the bridge circuit.

When the circuit is closed at the governing contacts, due to the high resistance of this circuit, its high impedance or both, the sparking at these governing contacts is made very small and since the spark is almost purely an inductive spark and due to an oscillatory inductive discharge when the contacts are broken, the spark can be entirely subdued by a suitable bridging of these contacts by a condenser, or a high non-inductive resistance; these expedients are well known in the art and are not herein illustrated, being omitted for the sake of simplicity in disclosure.

Also in bridge of the current supply conductors 1 and 2, I connect the terminals of the electric motor M.

The operation of the system of Fig. 1, is as follows:—When a source of alternating or direct current is connected to the incoming current leads 1 and 2, by operating an electric switch, not shown but understood, the motor will rotate its shaft S, at a speed depending upon the current supplied to the motor. The reed spring magnet FR and its carried contact CE and the stationary contact EC are so disposed that at a predetermined motor speed, the contact CE engages the fixed contact EC, whereupon the bridged circuit comprising these contacts and the serially connected electromagnet winding EM, is closed; and current from the current supply source will flow over this circuit, energizing the electromagnet and cause a flow of magnetic lines of force between the polar extremities of the magnetic circuit comprising the laminated magnetic core IC. Interposed in the path of these magnetic lines of force, is the rotating flywheel F, which rotates its near-peripheral portion between the magnetic poles of the electromagnet.

This sets up Foucault, or so called eddy currents in the disk-flywheel member, and which eddy currents in turn set up a magnetic field which coöperating with the primary magnetic field set up by the electromagnet in such a way that the primary field lines of force and the secondary field lines of force, attract one another so that there is a retarding of the speed of the electric disk, due to a magnetic "drag" on the rotating copper flywheel. Therefore it is to be seen that whenever the electromagnet is energized, that the motor speed is retarded and this effect is instantaneous, so that very quick corrections of motor speed are to be had in the system of my invention whenever such motor speed exceeds a predetermined high limit of motor speed.

And the system of my invention has this important advantage that I find by experiment that when an alternating source of current supply is connected to the leads 1 and 2, that this alternating current produces on the ordinary "universal" electrical motor, a considerable less degree of driving torque, so that the motor has less power and a somewhat lower speed, the voltage of course assumed to be substantially the same in both cases as that when direct current is used. Therefore, it is plain that less correction is needed, and since this is so the electromagnet of my invention takes care of this automatically, in that it also is less efficient to retard the speed of the motor when operating with alternating currents than with direct currents. This fact coupled with the fact that the corrective effect is obtained instantaneously, enables me to use the same universal motor with a given adjustment for alternating or direct currents over a considerable range of voltage of applied current, and I accomplish this result without undue sparking at the governing contacts, and at the same time secure a powerful braking action under the control of these contacts.

Referring now more particularly to Fig. 2, I show at R, an electrical relay connected in a circuit in the same way as the magnet EM of Fig. 1 is connected in the circuit illustrated in Fig. 1.

The magnet EM of Fig. 2, however, is connected in a local circuit independent of the governing contact CE—EC, the circuit for the magnet EM of Fig. 2, comprising serially included normally open contacts of the relay R. Serially included in the energizing circuit of the motor M, is a resistance coil RC, normally shunted by normal contacts NC of the relay R.

By virtue of this arrangement when the governing contacts are closed and the relay R is operated, in addition to the braking effect of the electromagnet EM upon the flywheel-disk F, a reduction in motor energization is had by the interposition of the serially included resistance coil RC in this energizing circuit. Thus, the braking effect upon the flywheel disk F, is magnified.

While I have illustrated a specific embodiment of my invention for the purpose of illustrating the same, I do not wish to be limited to such an embodiment as I am aware that numerous and extensive departures may be made from that herein specifically illustrated and described, without departing from the spirit of my invention, but what I claim is limited only by the defining appended claims:—

1. In combination with an electric motor, of a set of speed responsive contacts associated therewith and adapted to operate upon a predetermined motor speed, a motor shaft, an armature disk rotated by the said shaft when the motor is operated, a field electromagnet for the said armature, opposing poles therefor disposed on either side of an edge thereof, said magnet adapted when energized to retard the speed of rotation of the said armature, said speed responsive contacts when operated causing the energization of the said field magnet.

2. In combination with an electric motor, of a set of electrical contacts adapted to be responsive to complete a circuit at a predetermined motor speed, a motor shaft for the said motor, a thin rotatable armature disk of good current conducting material driven by the said shaft and adapted to be rotated when the said motor is operated, a pair of opposing field magnet poles disposed on opposite sides of the rotating disk and separated from each other a distance only slightly exceeding the thickness of the said armature disk and adapted when energized to retard the speed of rotation of the said armature, a field magnet winding and a source of energizing current being included in the said circuit.

3. In combination with a phonograph, of a turn-table therefor, an electric motor for operating said turn-table, a source of current for energizing the said motor, a thin metallic non-magnetic armature disk, rotated by the said shaft when the said motor is operated, a field magnet for said armature disk adapted when energized to project a stream of magnetic lines through the said disk to retard the speed of rotation of the said armature disk, a winding for the said field magnet adapted to be energized by the said source of current, centrifugally operated means to cause the energization of the said magnet upon a predetermined motor speed, and to cause deënergization thereof upon lower speeds.

4. In combination with an electric motor, a source of current for energizing the said motor, a shaft adapted to be rotated by the said motor when the said motor is energized a metallic disk of non-magnetic material secured to the said shaft and adapted to be rotated thereby, an electromagnet comprising magnetic poles between which the said disk is adapted to revolve, an energizing winding for the said electromagnet, speed controlled contacts associated with the said motor and adapted, only when operated upon a predetermined motor speed, to associate the said source of current with the said energizing winding.

5. In combination with an electric motor, a source of current for energizing the said motor, a shaft adapted to be rotated by the said motor when the said motor is energized, a metallic disk secured to the said shaft and adapted to be rotated thereby, an electromagnet comprising magnetic poles between which the said disk is adapted to revolve, an energizing winding for the said electromagnet, a reed carried by the said disk and adapted to be flexed by the action of centrifugal force when the said disk is rotated, an electric contact carried by the said reed, a coöperating electrical contact adapted to make an electrical connection with the said reed carried contact when the said reed is flexed to a predetermined degree, said contacts being serially included in a circuit together with the said source of current and with the said energizing electromagnet winding.

6. In combination, an electric motor, a motor driven shaft, a thin disk of good electrical conducting material carried on the said shaft and rotated thereby, an electromagnet having opposing poles disposed on either side of the disk near the same edge thereof, said poles being so disposed that the material of the disk will comprise a substantially large portion of the interpolar space, and intercept the flow of magnetic flux across the said space, a source of current, a speed responsive member, a pair of normally separated electric contacts, an energizing circuit for the said electromagnet, said circuit including said contacts and said source of current, said contacts being adapted to be closed whenever a predetermined desired motor speed is exceeded under the control of said speed responsive member, said electromagnet when energized being adapted to set up considerable flows of Foucault currents in the said disk, the reaction of the said currents being effective to immediately exercise a considerable retarding effect on the said disk to reseparate the said contacts.

7. In combination, an electric motor, a motor driven shaft, a thin disk of good electrical conducting material carried on the said shaft and rotated thereby, an electromagnet having opposing poles disposed on either side of the disk near the same edge thereof, said poles being so disposed that the material of the disk will comprise a substantially large portion of the interpolar space, and intercept the flow of magnetic flux across the said space, a source of current, a speed responsive member, a pair of normally separated electric contacts, an energizing circuit for the said electromagnet, said circuit including said contacts and said source of current, said contacts being adapted to be closed whenever a predetermined desired motor speed is exceeded under the control of said speed responsive member, said electromagnet when energized being adapted to set up considerable flows of Foucault currents in the said disk, the reaction of the said currents being effective to immediately exercise a considerable retarding effect on the said disk to re-separate the said contacts, a motor energizing circuit, a second pair of contacts, said contacts being normally closed and controlling the said motor energizing circuit, all of said contacts being operated at the same motor speed, and effective to reduce the motor speed.

8. In combination, an electric motor, a motor driven shaft, a thin disk of good electrical conducting material carried on the said shaft and rotated thereby, an electromagnet having opposing poles disposed on either side of the disk near the same edge thereof, said poles being so disposed that the material of the disk will comprise a substantially large portion of the interpolar space, and intercept the flow of magnetic flux across the said space, a source of current, a speed responsive member, a pair of normally separated electric contacts, an energizing circuit for the said electromagnet, said circuit including said contacts and said source of current, said contacts being adapted to be closed whenever a predetermined desired motor speed is exceeded under the control of said speed responsive member, said electromagnet when energized being adapted to set up considerable flows of Foucault currents in the said disk, the reaction of the said currents being effective to immediately exercise a considerable retarding effect on the said disk to re-separate the said contacts, said contacts being adapted to be restored on very slight speed retardations to instantly disable the speed retarding action of the said electromagnet.

9. In combination, an electric motor, a motor driven shaft, a thin disk of good electrical conducting material carried on the said shaft and rotated thereby, an electromagnet having opposing poles disposed on either side of the disk near the same edge thereof, said poles being so disposed that the material of the disk will comprise a substantially large portion of the interpolar space, and intercept the flow of magnetic flux across the said space, a source of current, a speed responsive member, a pair of normally separated electric contacts, an energizing circuit for the said electromagnet, said circuit including said contacts and said source of current, said contacts being adapted to be closed whenever a predetermined desired motor speed is exceeded under the control of said speed responsive member, said electromagnet when energized being adapted to set up considerable flows of Foucault currents in the said disk, the reaction of the said currents being effective to immediately exercise a considerable retarding effect on the said disk to re-separate the said contacts, a motor energizing circuit, a second pair of contacts controlling the said motor energizing circuit, all of said contacts being operated at the same motor speed and effective to reduce the motor speed.

10. In combination, an electric motor, a motor driven shaft, a thin disk of good electrical conducting material carried on the said shaft and rotated thereby, an electromagnet having opposing poles disposed on either side of the disk near the same edge thereof, said poles being so disposed that the material of the disk will comprise a substantially large portion of the interpolar space, and intercept the flow of magnetic flux across the said space, a source of current, a speed responsive member, a pair of normally separated electric contacts, an energizing circuit for the said electromagnet, said circuit including said contacts and said source of current, said contacts being adapted to be closed whenever a predetermined desired motor speed is exceeded under the control of said speed responsive member, said electromagnet when energized being adapted to set up considerable flows of Foucault currents in the said disk, the reaction of the said currents being effective to immediately exercise a considerable retarding effect on the said disk to re-separate the said contacts, a motor energizing circuit, a second pair of contacts controlling the said motor energizing circuit, all of said contacts being operated at the same motor speed and effective to reduce the motor speed, said contacts being adapted to be restored on very slight speed retardations to instantly disable the speed retarding action of the said electromagnet.

In witness whereof, I hereunto subscribe my name this 14 day of May, A. D. 1919.

WILLIAM W. DEAN.